United States Patent
Wang et al.

(10) Patent No.: US 7,266,439 B2
(45) Date of Patent: Sep. 4, 2007

(54) FUEL PROPERTY-ADAPTIVE ENGINE CONTROL SYSTEM WITH ON-BOARD FUEL CLASSIFIER

(75) Inventors: Junmin Wang, Helotes, TX (US); Gary D. Neely, San Antonio, TX (US); Shizuo Sasaki, San Antonio, TX (US); Thomas W. Ryan, III, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 11/243,805

(22) Filed: Oct. 5, 2005

(65) Prior Publication Data

US 2006/0080025 A1    Apr. 13, 2006

Related U.S. Application Data

(60) Provisional application No. 60/616,068, filed on Oct. 5, 2004.

(51) Int. Cl.
*G06F 17/00* (2006.01)
*G06F 19/00* (2006.01)

(52) U.S. Cl. .................. 701/106; 701/115
(58) Field of Classification Search ............. 701/106, 701/102, 103, 104, 115; 706/22, 23; 73/35.02, 73/23.2; 123/1 A, 494, 575, 567, 577
See application file for complete search history.

(56) References Cited

U.S. PATENT DOCUMENTS

| 5,229,946 | A | | 7/1993 | Ghaem ............... 364/431.05 |
|---|---|---|---|---|
| 5,654,497 | A | * | 8/1997 | Hoffheins et al. ......... 73/23.2 |
| 5,915,368 | A | | 6/1999 | Ishida et al. ............. 123/675 |
| 5,941,217 | A | | 8/1999 | Cheng et al. ............ 123/494 |
| 6,122,589 | A | | 9/2000 | Yamaguchi et al. ....... 701/106 |
| 6,289,275 | B1 | | 9/2001 | Stander et al. ........... 701/104 |
| 6,318,152 | B1 | | 11/2001 | Hagihara et al. ........ 73/35.02 |
| 6,360,726 | B1 | | 3/2002 | Javaherian ............. 123/491 |
| 6,468,069 | B2 | | 10/2002 | Lemelson et al. .......... 431/12 |
| 6,687,597 | B2 | | 2/2004 | Sulatisky et al. ......... 701/104 |
| 6,745,613 | B2 | | 6/2004 | Rendahl et al. ......... 73/35.02 |
| 6,760,658 | B2 | | 7/2004 | Yasui et al. .............. 701/106 |
| 6,947,830 | B1 | * | 9/2005 | Froloff et al. ............ 701/111 |

OTHER PUBLICATIONS

International Search Report with Written Opinion, PCT/US05/35736, 8 pages, Jan. 5, 2007.

* cited by examiner

*Primary Examiner*—Willie R. Wolfe
*Assistant Examiner*—Johnny H. Hoang
(74) *Attorney, Agent, or Firm*—Baker Botts LLP

(57) ABSTRACT

A fuel property adaptive control system for controlling the performance of an engine, such as an internal combustion engine. An on-board fuel classifier classifies the fuel that the engine is running. Based on stored properties for that fuel, the system selects optimal engine control parameters.

21 Claims, 7 Drawing Sheets

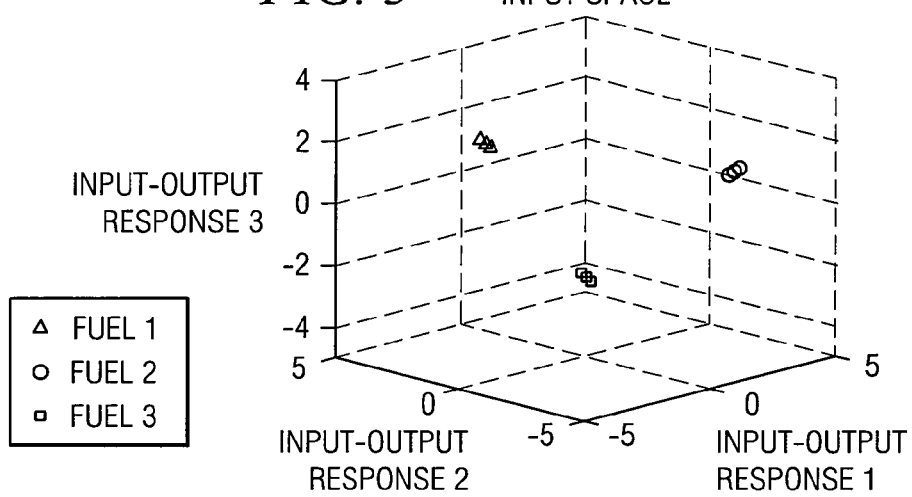
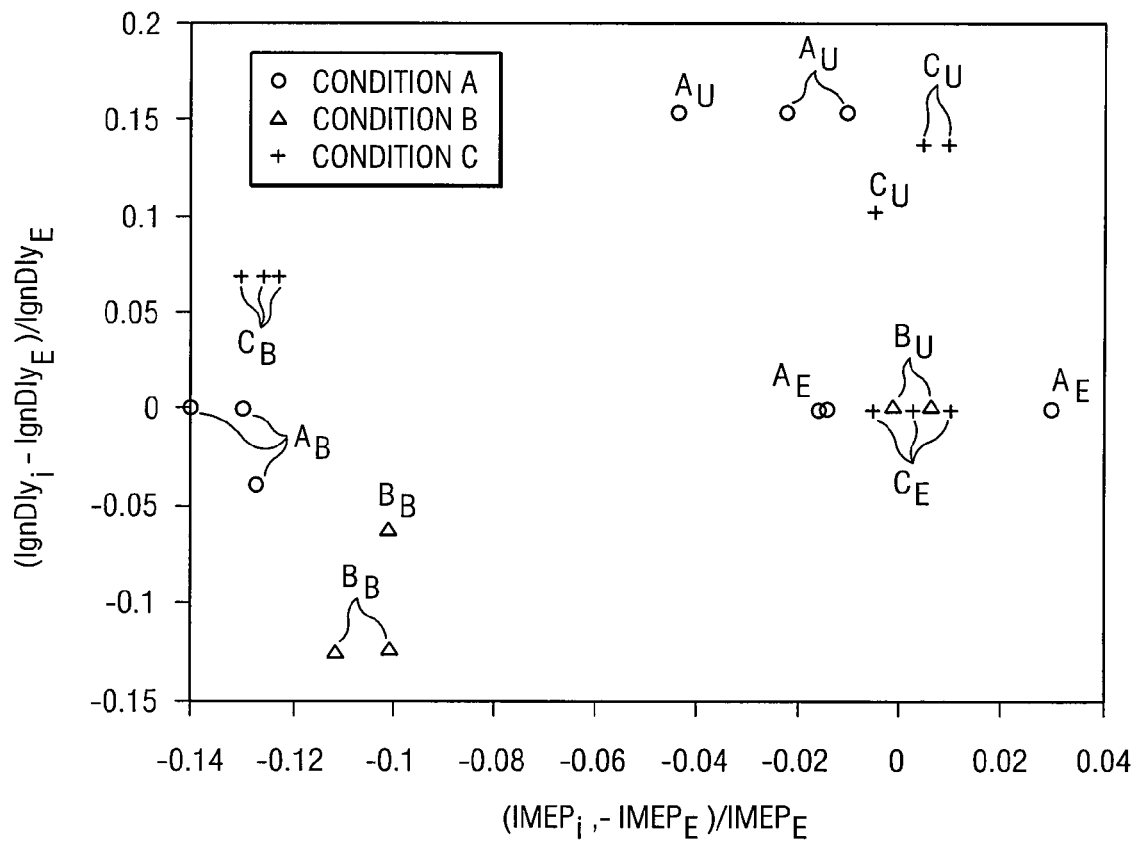

| FUEL TYPE | INPUT TO THE CLASSIFIER | | OUTPUT OF THE CLASSIFIER (CODE OF THE FUEL) |
|---|---|---|---|
| | $\dfrac{IMEP_i - IMEP_E}{IMEP_E}$ | $\dfrac{IgnDly_i - IgnDly_E}{IgnDly_E}$ | |
| EURO III | [-0.0157; 0.0] | | [0;0] (0) |
| | [0.0303; 0.0] | | [0;0] (0) |
| | [-0.0146; 0.0] | | [0;0] (0) |
| US ULSD | [-0.0107; 0.1538] | | [0;1] (1) |
| | [-0.0226; 0.1538] | | [0;1] (1) |
| | [-0.0439; 0.1538] | | [0;1] (1) |
| BIO-DIESEL | [-0.1299; 0.0] | | [1;0] (2) |
| | [-0.127; -0.0385] | | [1;0] (2) |
| | [-0.1397; 0.0] | | [1;0] (2) |

FIG. 10

| FUEL TYPE | INPUT TO THE CLASSIFIER | | OUTPUT OF THE CLASSIFIER (CODE OF THE FUEL) |
|---|---|---|---|
| | $\dfrac{IMEP_i - IMEP_E}{IMEP_E}$ | $\dfrac{IgnDly_i - IgnDly_E}{IgnDly_E}$ | |
| EURO III | [-0.0051; 0.0] | | [0;0] (0) |
| | [0.0051; 0.0] | | [0;0] (0) |
| | [0.0001; 0.0] | | [0;0] (0) |
| US ULSD | [-0.0048; 0.1034] | | [0;1] (1) |
| | [0.0047; 0.1379] | | [0;1] (1) |
| | [0.0097; 0.1379] | | [0;1] (1) |
| BIO-DIESEL | [-0.1256; 0.069] | | [1;0] (2) |
| | [-0.1301; 0.069] | | [1;0] (2) |
| | [-0.1224; 0.069] | | [1;0] (2) |

FIG. 11

| FUEL TYPE | INPUT TO THE CLASSIFIER | | OUTPUT OF THE CLASSIFIER (CODE OF THE FUEL) |
|---|---|---|---|
| | $\dfrac{\dfrac{IMEP_i}{Q_i} - \dfrac{IMEP_E}{Q_E}}{\dfrac{IMEP_E}{Q_E}}$ | $\dfrac{IgnDly_i - IgnDly_E}{IgnDly_E}$ | |
| EURO III | [-0.0157; 0.0] | | [0;0] (0) |
| | [0.0303; 0.0] | | [0;0] (0) |
| | [-0.0146; 0.0] | | [0;0] (0) |
| US ULSD | [-0.0107; 0.1538] | | [0;1] (1) |
| | [-0.0226; 0.1538] | | [0;1] (1) |
| | [-0.0439; 0.1538] | | [0;1] (1) |
| BIO-DIESEL | [-0.1551; 0.385] | | [1;0] (2) |
| | [-0.1588; 0.0385] | | [1;0] (2) |
| | [-0.1809; 0.0] | | [1;0] (2) |

FIG. 12

| FUEL TYPE | INPUT TO THE CLASSIFIER | | OUTPUT OF THE CLASSIFIER (CODE OF THE FUEL) |
|---|---|---|---|
| | $\dfrac{\dfrac{IMEP_i}{Q_i} - \dfrac{IMEP_E}{Q_E}}{\dfrac{IMEP_E}{Q_E}}$ | $\dfrac{IgnDly_i - IgnDly_E}{IgnDly_E}$ | |
| EURO III | [-0.0051; 0.0] | | [0;0] (0) |
| | [0.0051; 0.0] | | [0;0] (0) |
| | [0.0001; 0.0] | | [0;0] (0) |
| US ULSD | [-0.0048; 0.1034] | | [0;1] (1) |
| | [0.0047; 0.1379] | | [0;1] (1) |
| | [0.0097; 0.1379] | | [0;1] (1) |
| BIO-DIESEL | [-0.1137; 0.0] | | [1;0] (2) |
| | [-0.1015; 0.0] | | [1;0] (2) |
| | [-0.0847; 0.0] | | [1;0] (2) |

FUEL PROPERTY-ADAPTIVE ENGINE CONTROL SYSTEM WITH ON-BOARD FUEL CLASSIFIER

CROSS-REFERENCE TO RELATED APPLICATIONS

This application claims the benefit of U.S. Provisional Application Ser. No. 60/616,068 filed Oct. 5, 2004, which is incorporated herein by reference in its entirety.

TECHNICAL FIELD OF THE INVENTION

This invention relates to engine control systems, and more particularly to an engine control system that is adaptive to the output of a fuel classifier.

BACKGROUND OF THE INVENTION

Today's marketplace offers an increasing selection of fuels for engines, particularly internal combustion engines. These fuels have different properties, and fuel variations greatly affect engine performance. In addition, as emissions regulations become increasingly more stringent, fuel properties become increasingly important to the effectiveness of emissions treatments systems (also referred to herein as after-treatment systems).

Engine control systems and emissions treatment systems have become highly sophisticated, often using processor-based calibration and/or modeling techniques. However, currently, fuel properties are unknown to these systems. Engine calibration tables and models are often compromised to tolerate fuel property variations, resulting in less than optimal control systems.

BRIEF DESCRIPTION OF THE DRAWINGS

FIG. 3 illustrates an example of an input space for the fuel classifier.

FIG. 5 illustrates an input space for three engine operating conditions, under a first classification scenario.

FIG. 6 illustrates an input space for two of three engine operating conditions of FIG. 5.

FIGS. 9 and 10 illustrate validation results for the classifier for Conditions A and C, respectively, for the first classification scenario.

FIGS. 11 and 12 illustrate validation results for the classifier for Conditions A and C, respectively, for the second classification scenario.

DETAILED DESCRIPTION OF THE INVENTION

Overview of Fuel Classifier

The following description is directed to methods and systems for automatic on-board classification of fuel being used by an engine. The description is in terms of an internal combustion engine for a vehicle, such as an automobile, which also has an emissions treatment system. However, in its broadest application, the methods and systems described herein could be used with any engine that uses liquid or gas fuel.

The invention is based on the fact that the engine's fuel is both the energy and the emissions source in internal combustion engines. The fuel properties have a direct influence on both the in-cylinder combustion and exhaust treatment systems.

As described below, based on engine operating conditions and selected input/output pairs, a "fuel classifier" provides data about the fuel the engine is running on. This data is then provided to the engine control system to select the optimal parameters, maps, and strategies for engine models, in-cylinder combustion, as well as exhaust treatment system management and fault diagnostics. This results in optimal control for both in-cylinder combustion and the engine's emissions treatment system.

The fuel classifier causes the engine control system to be automatically adaptive to whatever fuel the engine operates. Thus, the engine control system is fuel property adaptive rather than fuel property dependent. The classifier uses various sensor output and engine response characteristics to differentiate fuel properties. The classifier is useful with standard diesel and gasoline fuels and also with alternative fuels, renewable fuels, and fuel blends.

Figure 1:
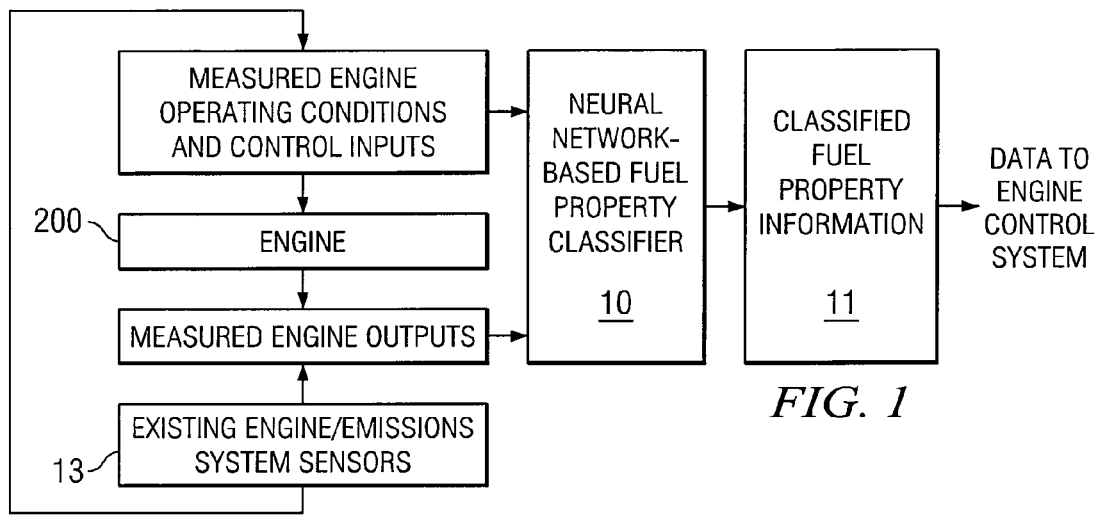
FIG. 1 illustrates a fuel classifier in accordance with the invention.

FIG. 1 illustrates a fuel classifier 10 in accordance with the invention, as well as its data inputs and outputs. Classifier 10 may be installed on-board a vehicle or other engine-driven equipment. Classifier 10 is active when engine 200 is running, using the fuel in question, in conditions suitable for classifying the fuel.

Data inputs to classifier 10 include measured engine operating conditions and control inputs to the engine. Examples of engine operating conditions are coolant temperature, engine speed, pedal position, and engine load. Examples of engine control inputs are injection timing, injection fuel volume, and injection fuel pressure. Data inputs to classifier 10 further include engine outputs. Examples of engine outputs are ignition delay, heat release rate, instantaneous torque, cylinder pressure, indicated mean effective pressure (IMEP), exhaust air/fuel ratio sensor signal, and smoke sensor signal.

In general, in addition to engine conditions, inputs, and outputs, any measured data from any sensor associated with the engine, emissions system, or vehicle could be used as input. Data derived from such measured data could also be used.

The input data to classifier 10 may be acquired from conventional engine sensors, emissions system sensors, or other vehicle sensors 13. No dedicated or special sensors are required. A possible exception, in view of today's automotive systems, is a cylinder pressure sensor. However, automotive-grade cylinder pressure sensors will likely be used in the near future for combustion control and injector diagnostics on many engines.

Classifier 10 may be implemented with a neural network. It classifies the fuel the engine is consuming, based on relationships between engine operating conditions, control inputs, and the corresponding engine outputs. The neural network may be implemented and programmed using technology known in the field of neural networks. Further description of the development of the neural network is set out below. In other embodiments, processor-based devices other than a neural network may be appropriately programmed to classify fuel based on the methods described herein.

Detectable Fuel Properties

Not all fuel properties are detectable from relationships between engine control inputs and engine outputs. The set of fuel properties, $S_p$, that is important to engine performance and emissions may be divided into two subsets. Thus:

$S_p$ fuel properties
$S_d$ fuel properties not detectable from engine input/output relationships
$S_e$ fuel properties detectable from engine input/output relationships, , and $S_p = S_e + S_d$ for all fuels.

If, for different fuels, the properties in the subsets, $S_e$, are distinct from each other, then the fuel type can be classified based on the easily detected properties in the subsets, $S_e$. Therefore, all the fuel properties become available because all the property information associated with a specific fuel type are known and stored in the classifier in advance. A memory device 11 accessible by fuel classifier 10 is used to store predetermined fuel property data.

Figure 2:
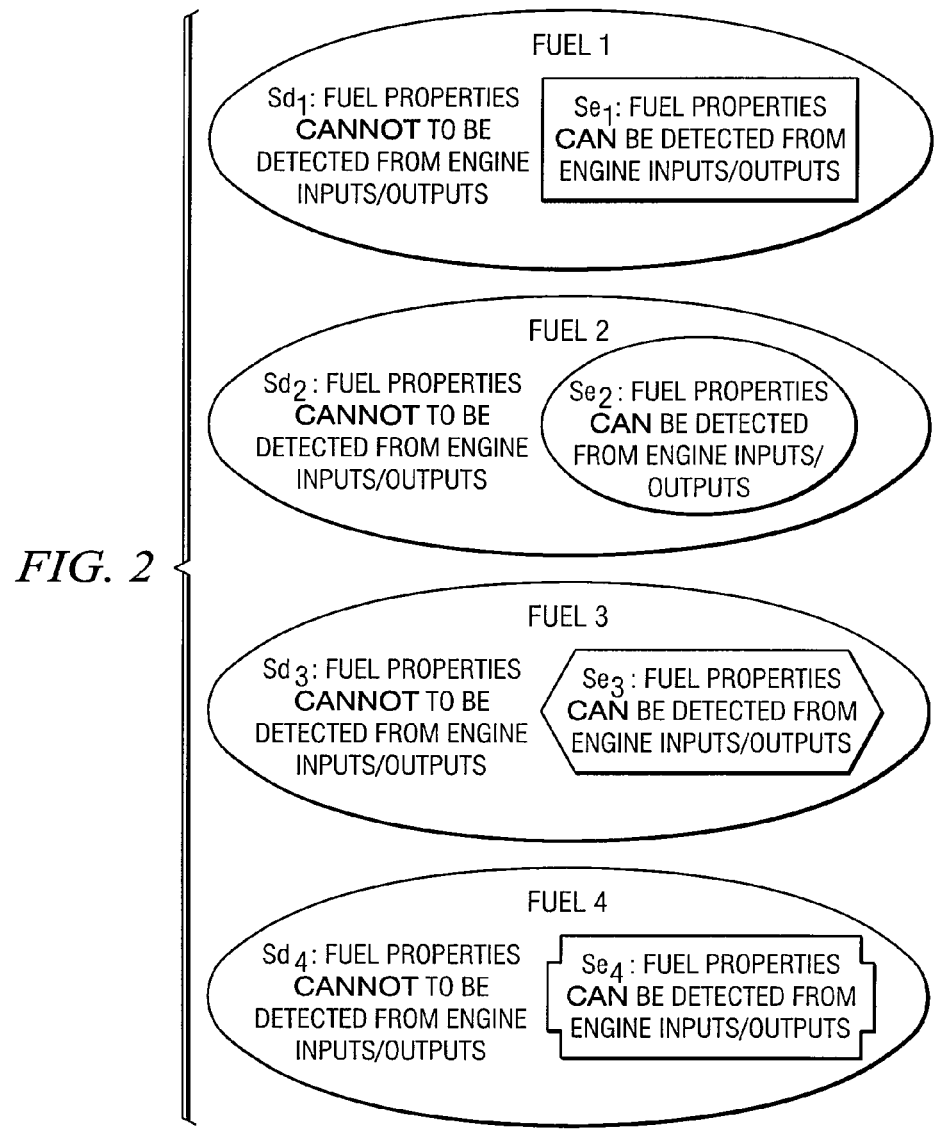
FIG. 2 illustrates various fuels and their properties.

FIG. 2 illustrates four different fuels, namely Fuel 1, Fuel 2, Fuel 3, and Fuel 4. Each of these fuels has different properties. For each of these fuels, the properties important to engine control can be divided into two subsets:

$S_{di}$ properties not detectable from engine inputs and outputs
$S_{ei}$ properties detectable from engine inputs and outputs, , where i=1,2,3, 4.

As illustrated, $S_{e1}$, $S_{e2}$, $S_{e3}$, and $S_{e4}$ have different shapes indicating their properties are different, these properties can be used as signatures for each different fuel. Automatically, the fuel properties that are not detectable, $S_{d1}$, $S_{d2}$, $S_{d3}$, and $S_{d4}$, become available because once the fuel type is classified using classifier 10, all the associated properties are known from data stored in memory 11.

Thus, all fuel properties for a particular fuel are available for consideration of optimum engine and emissions system performance. Furthermore, as indicated above, properties of any number of different fuels can be stored. Examples of fuel properties of interest are cetane number, lower heating value, sulfur level, viscosity, hydrogen to carbon ratio, stoichiometric air/fuel ratio, and density.

To ensure reliability and robustness of classifier 10, engine operating conditions under which classifier 10 is active are experimentally determined. In other words, by experimentation, it is determined what engine operating conditions are most likely to provide accurate classification results. Then, classifier 10 is programmed to perform its classification process under those conditions.

FIG. 3 illustrates an example of the input space for the fuel classifier. Various fuel property related engine input-output responses are used to span the input space of the classifier. If different fuels are separable in the input space, then they can be classified. The greater the dimension of the input space, the more confident the classification.

Engine Control System

Figure 4:
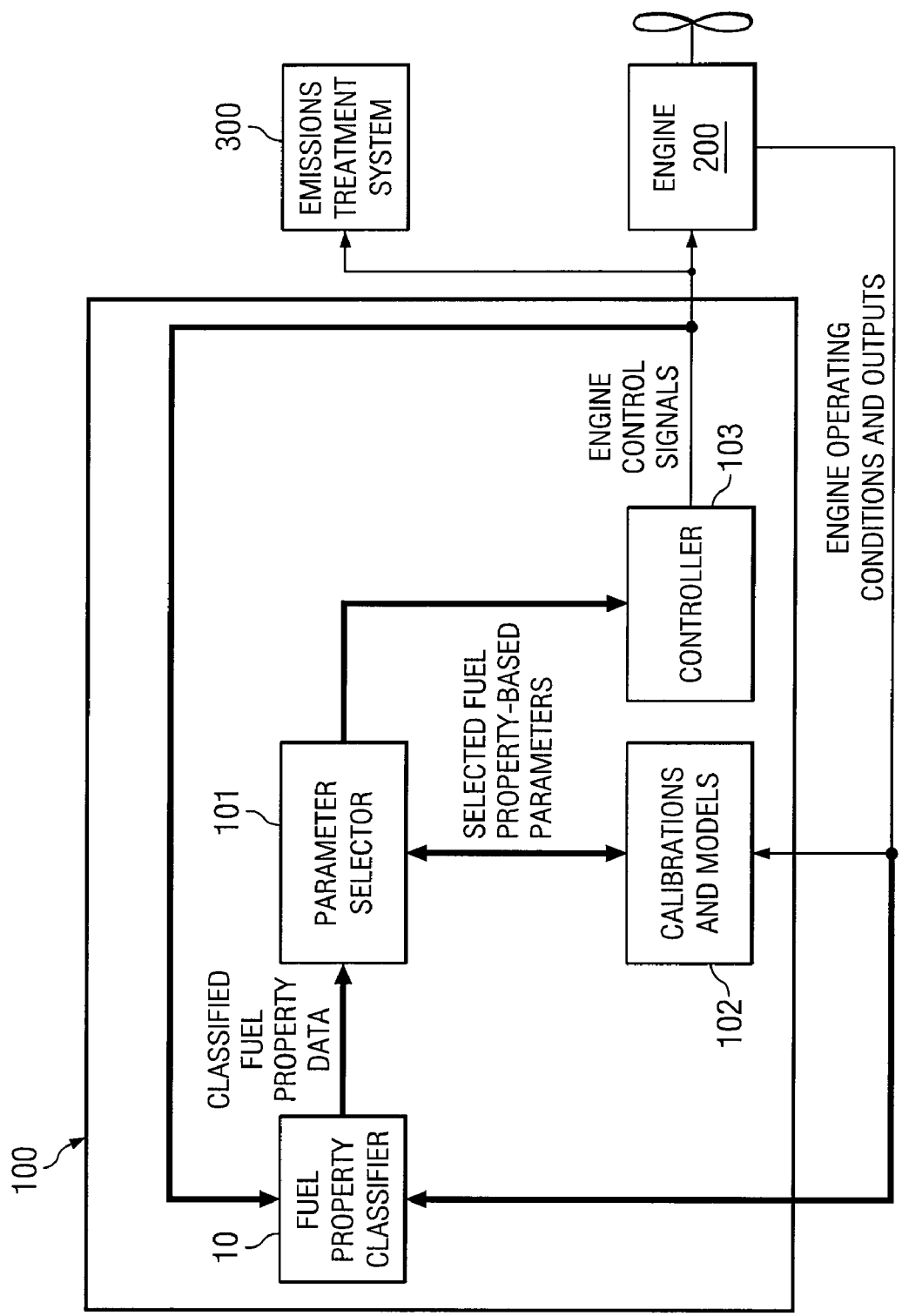
FIG. 4 illustrates a fuel-adaptive engine and emissions system control system in accordance with the invention.

FIG. 4 illustrates an engine control system 100 in accordance with the invention. For different fuels, engine combustion and exhaust is different, and engine control system 100 treats them differently to obtain optimal performance of engine 200 and emissions treatment system 300.

Various elements of system 100 may be implemented with conventional engine control system components. For example, the memory 102 that stores fuel-property dependent models and calibrations and the controller 103 may be conventional devices.

Control system 100 uses classifier 10 to detect the fuel type that engine 200 is running. It classifies fuel according to a closest match, based on the relationships between engine operating conditions, control inputs, and the engine outputs. Based on the classified fuel type, the corresponding fuel properties are retrieved from a database within classifier 10. Classifier 10 delivers fuel classification data to selector 101.

Selector 101 stores corresponding control parameters for engine 200, emissions treatment system 300, or other systems associated with the engine. "Parameters" is meant herein to mean any data affecting operation, mapping, or strategy for control of engine 200, emissions treatment system 300, or any other mechanics associated with engine-driven equipment. These parameters may be predetermined and stored during engine development and testing, then stored in memory 102. Each fuel type capable of being output from classifier 10 has an associated set of control parameters.

The parameters selected by selector 101 are delivered to controller 103, which delivers control signals to the engine 200 and/or emissions treatment system 300. In some cases, selector 101 may access a models memory 102, which may store data representing various engine models. Such models are known in the art of conventional fuel property dependent engine control systems. The selector may match the fuel type (or intermediate parameter data) to the model data for purposes of determining control parameters to be delivered to controller 103.

Controller 103 uses the control parameters to generate control signals for the engine, the emissions control system, or any other equipment that may be associated with the engine and affected by fuel type.

Examples of Fuel Property Dependent Systems

Specific examples of systems that can benefit from the fuel property information are those represented by in-cylinder combustion models, exhaust composition estimation models, exhaust system models and engine performance optimization models. These are example of models that may be stored in models database 102.

In-cylinder combustion models. As the direct source of combustion, fuel has properties that affect both the physical characteristics and chemical kinetics of the combustion process. Fuel properties have a vital influence on combustion models and therefore, the model-based engine control. The classified fuel property information can be used in the combustion models to improve the accuracy of the models.

Exhaust composition estimation models. Fuel properties strongly affect the engine-out exhaust composition. For engines equipped with exhaust gas recirculation (EGR) systems, the composition of the exhaust gas will affect the composition of the in-cylinder air/EGR mixture. It is necessary to have the fuel property information in order to have a good estimation of the in-cylinder gas mixture composition and realize the optimal combustion control. In addition, the engine-out emission estimation models are also required to manage the exhaust treatment systems wisely. For example, an engine-out NOx model may be required to estimate the storage state of a NOx trap and decide when to issue regeneration requests. NOx prediction is based on flame temperature which depends on the in-cylinder gas composition. The availability of the fuel properties that the engine is running will help improve the accuracy of these models and realize the optimal management of the exhaust treatment systems in terms of performance and minimized fuel penalty.

Fault diagnostics for the exhaust treatment system. As the dependence on using exhaust treatment systems to meet future emissions regulations increases, monitoring the health of these systems becomes a very important issue. Any failures or trends of possible failure of these systems need to be detected quickly. The properties of the fuel that the engine is running are important inputs for models used to monitor the status of those systems.

Engine performance optimization. Fuel properties, such as cetane number, lower heating value, density etc., affect the engine power, fuel economy, cold starting performance, and combustion noise. Optimal engine performance for a specific fuel can be achieved if the fuel property information is available to the engine control system, which allows the control system to select the optimal fuel property-oriented parameters.

Relationships Between Fuel Properties and Engine Properties and Engine Input-Output Response Characteristics Several significant relationships between the fuel properties and engine input-output responses are described below.

For diesel fuel, an important property is the cetane number. Cetane is a hydrocarbon molecule that ignites very easily under compression. All the hydrocarbons in the diesel fuel are indexed to cetane as to how well they ignite under compression. The relation between the cetane number of the fuel and the ignition delay have been experimentally explored, showing a strong correlation.

Another important fuel property is the lower heating value, which is the chemical energy per unit mass of the fuel and is roughly proportional to the indicated mean effective pressure (IMEP). At the same condition, the torque and the IMEP produced by the engine will be different if the heating values of the fuels are different. Therefore, the calculated IMEP from the cylinder pressure signal could be used to distinguish the fuels with different lower heating values.

In addition, there are other relationships between fuel properties and engine input-output responses. For example, the measured air/fuel ratio of the engine exhaust is connected with the stoichiometric air/fuel ratio of the fuel. The smoke level of the exhaust is related to the hydrogen to carbon ratio (H/C) of the fuel.

Experimentation

For proof-of-concept purposes, three different diesel fuels with various fuel property variations were chosen. The first test fuel was a high cetane number Euro III diesel fuel. The second test fuel was an ultra-low sulfur diesel (ULSD). The last test fuel was 100% bio-diesel fuel.

To develop the on-board fuel property classifier 10, as well as to define the appropriate engine operating conditions for the classifier to be active, tests were conducted at different operating conditions with different combinations of engine load levels, EGR rates, and injection events as described below. Two different classification scenarios (same engine inputs for all three fuels and variable inputs with matching torque for different fuels) were compared. The first classification scenario used the same set points for each fuel. The second classification scenario was aimed at achieving the same vehicle driving conditions, where the driver adjusts the pedal (adjusts the fuel injection quantity) to get the same torque from the engine to meet the power requirements at certain driving conditions with different fuels.

The three different operating conditions (A, B, and C) are defined by the following table:

|  | Condition A | Condition B | Condition C |
|---|---|---|---|
| Engine Speed (rpm) | 2000 | 2000 | 2000 |
| Target Torque* (Nm) | 40 | 100 | 100 |
| Injection Events | Pilot + Main | Main | Pilot and Main |
| EGR | With EGR | W/O EGR | W/O EGR |

*Target torque for the matching torque scenario only

Scenario I. The first fuel property classification scenario used the same engine control inputs for the three different fuels at the three different engine conditions as defined in the above table. Various engine input-output response characteristics were used to distinguish the fuels. At each condition, the engine control input variables were decided based on tests using Euro III diesel fuel.

The detailed control input variables are listed as below:

|  | Condition A | Condition B | Condition C |
|---|---|---|---|
| Pilot Injection Timing (bTDC) | 22 | N/A | 28 |
| Pilot Injection Pulse Width (ms) | 0.20 | N/A | 0.20 |
| Main Injection Timing (bTDC) | 5 | 6 | 5 |
| Main Injection Pulse Width (ms) | 0.515 | 0.685 | 0.612 |
| Rail Pressure (bar) | 650 | 800 | 800 |
| EGR Valve Duty Cycle (%) | 60 | 0 | 0 |
| Swirl Control Valve Duty Cycle (%) | 95%* | 0% | 0% |
| Intake Throttle Valve Position | 46 | open | open |
| Turbo Wastegate Duty Cycle (%) | 95%** | 95% | 95% |

*high swirl
**maximum boost

Scenario II (Matching Torque). The second fuel property classification scenario used variable engine control inputs to match the target torque for all fuels. From the classification scenario I test results, Euro III and ULSD fuels were found to produce almost the same torque, while the torque levels for bio-diesel were noticeably lower with the same engine control inputs at all three conditions. Therefore, for Scenario II, only the control inputs for the bio-diesel fuel were adjusted (mainly the injection pulse widths) to match the target torque value of Scenario I. Therefore, the engine control inputs for the Euro III and ULSD were the same as in the scenario I experiments.

The control input variables used for Scenario II are summarized below.

|  | Condition A | Condition B | Condition C |
|---|---|---|---|
| Pilot Injection Timing (bTDC) | 22 | N/A | 28 |
| Pilot Injection Pulse Width (ms) | 0.224 | N/A | 0.211 |
| Main Injection Timing (bTDC) | 5 | 6 | 5 |
| Main Injection Pulse Width (ms) | 0.577 | 0.810 | 0.670 |
| Rail Pressure (bar) | 650 | 800 | 800 |
| EGR Duty Cycle (%) | 60 | 0 | 0 |
| Swirl Control Valve Duty Cycle (%) | 95% | 0% | 0% |
| Throttle Valve Position (deg.) | 46 | open | open |
| Waste Gate Duty Cycle (%) | 95% | 95% | 95% |

Development of Neural Network Based Fuel Property Classifier

Based on experimental data, and on relationships between the fuel properties and the engine input-output responses, a neural network for implementing fuel property classifier 10 may be designed.

For the first fuel property classification scenario, same engine inputs for all the different fuels, tests were conducted for three different fuels at three different operating conditions. From the properties of the three fuels, a big difference between the cetane number of US ULSD and those of Euro III and bio-diesel (the Euro III and the bio-diesel have similar cetane numbers) were observed. On the other hand, Euro III and US ULSD had similar heating values, whereas the bio-diesel had a relatively low heating value. Thus, the two engine output variables, ignition delay and IMEP, may be used to construct an input vector to classify these three different fuels.

To improve the reliability of classifier 10, instead of using the absolute values of the ignition delay and IMEP as the inputs to the neural network, normalized variations of these two variables were used. The input normalization approach is described next.

At each operating condition (A, B, and C as defined above), a 3-run average of the ignition delay and IMEP of the Euro III fuel was used as the basis. The differences were calculated and normalized with respect to the basis. For example, at condition A, the inputs for the classifier were calculated as follows:

$$ClassifierInputVector = \begin{bmatrix} \dfrac{IMEP_i - IMEP_E}{IMEP_E} \\ \dfrac{IgnDly_i - IgnDly_E}{IgnDly_E} \end{bmatrix},$$

where IMEPi was the calculated IMEP for each test from the cylinder pressure signal, $IMEP_E$ was the 3-run average IMEP of the Euro III fuel at this condition, $IgnDly_i$ was the measured ignition delay for each test, and $IgnDly_E$ was a 3-run average ignition delay of the Euro III fuel at this condition. Similarly, at conditions B and C, the 3-run average values of the IMEP and ignition delay of the Euro III fuel were used as the basis for normalization of the input to the fuel property classifier.

As mentioned above, the ignition delay and IMEP are associated with the cetane number and heating value of the fuel, respectively. Theoretically, fuels with different cetane number and heating value will produce measurably different ignition delays and IMEP's at same operating condition. However, in practice, due to combustion noise, measurement accuracy, and the complex nature of the engine system, the relationships between the fuel properties and engine input-output responses may not be obvious at every operating condition. To ensure the reliability and accuracy of the fuel property classifier, suitable engine operating conditions for the classifier to be active were experimentally determined.

FIG. 5 shows the fuel property classifier input space (normalized IMEP variation and normalized ignition delay variation) at conditions A, B, and C. The subscripts associated with each condition represent the fuel type (E: Euro III fuel; U: US ULSD fuel; B: Bio-diesel fuel). For example, $A_U$ represents US ULSD fuel at operating condition A.

As shown in FIG. 5, the Euro III fuel, ULSD fuel and bio-diesel fuel can be separated well in the input space with the exception of the ignition delays of the Euro III fuel and the ULSD fuel, which are almost the same at condition B (characterized by a single injection and no EGR). Therefore, conditions A and C were determined as the suitable conditions for the fuel property classifier to be active.

Figures 6, 9:
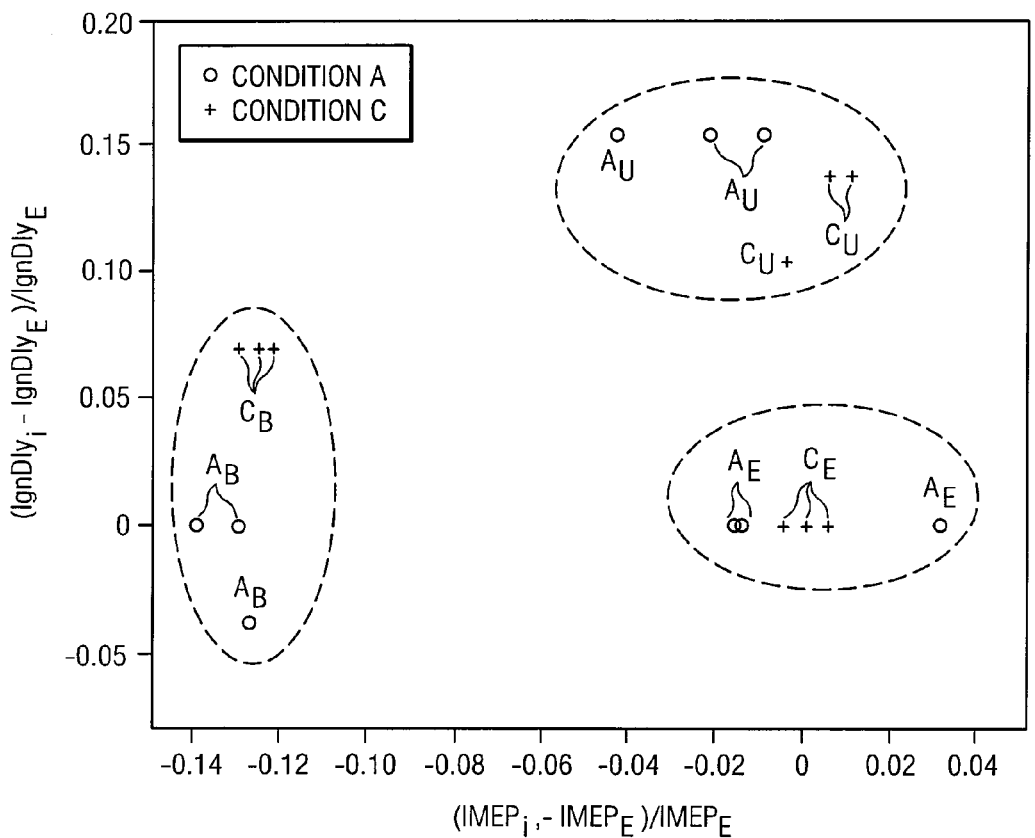

FIG. 6 shows the input space for the 3 different fuels at conditions A and C. As shown, an input vector can clearly separate the Euro III fuel, ULSD fuel, and bio-diesel fuel using these two conditions. This provides good input information for the neural network-based fuel property classifier.

For the second fuel property classification scenario, which was matching torque for the three different fuels to produce the same IMEP (torque), the fuel injection quantities of the Euro III fuel and the ULSD fuel were almost identical. In contrast, the fuel injection quantity of the bio-diesel fuel was noticeably higher (which was due to the relatively low heating value of the bio-diesel). So, the normalized IMEP with respect to the fuel injection quantity (calculated from rail pressure and injection pulse width) is different for fuels with different heating values.

Figure 7:
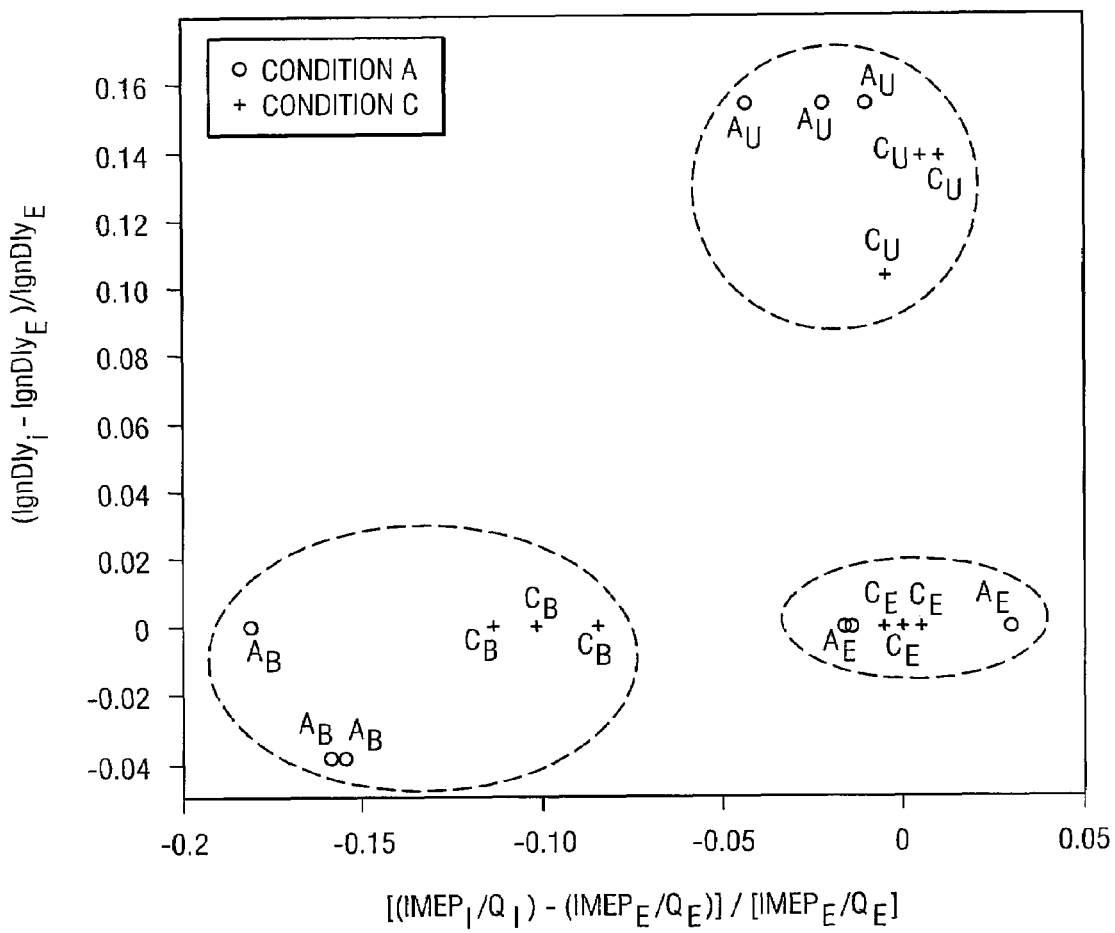
FIG. 7 illustrates an input space for the two operating conditions of FIG. 6, but under a second classification scenario.

FIG. 7 illustrates that normalized IMEP along with the ignition delay can be used to span the input space to classify the three fuels in Scenario II. As before, the classifier active conditions are conditions A and C.

For Scenario II, the input vector is described in the following equation:

$$ClassifierInputVector = \begin{bmatrix} \dfrac{\dfrac{IMEP_i}{Q_i} - \dfrac{IMEP_E}{Q_E}}{\dfrac{IMEP_E}{Q_E}} \\ \dfrac{IgnDly_i - IgnDly_E}{IgnDly_E} \end{bmatrix},$$

where IMEPi was the calculated IMEP for each test from the cylinder pressure signal, $IMEP_E$ was the 3-run average IMEP of the Euro III fuel at this condition, $IgnDly_i$ was the measured ignition delay for each test, and $IgnDly_E$ was a 3-run average ignition delay of the Euro III fuel at this condition. At condition C, the 3-run average values of the IMEP and ignition delay of the Euro III fuel were used as the basis for normalization of the input to the fuel property classifier.

Based on the above analysis, it is clear that by using the described input space (normalized IMEP variation and normalized ignition delay variation) at conditions A and C, the three test fuels (Euro III, ULSD, and bio-diesel) can be linearly separated. Therefore, a simple perceptron-based neural network was designed to classify these three fuels using a hard limit transfer function.

Figure 8:
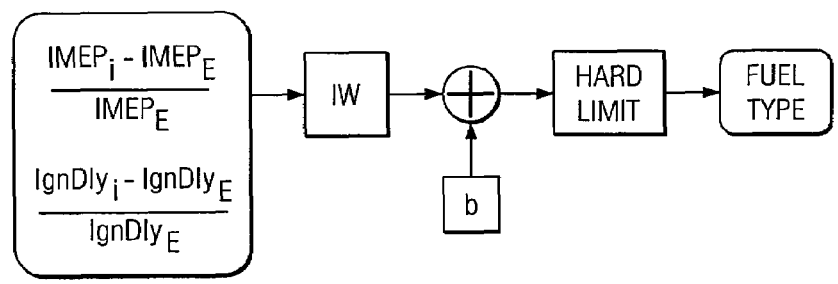
FIG. 8 illustrates the neural network structure of the classifier of FIGS. 1 and 4.

FIG. 8 illustrates the mathematical structure of classifier 10. The hard limit transfer function can be described as:

HardLimit $(x)=1$, if $x>=0$ 0, otherwise

The output is 1 when the input is greater than or equal to zero and outputs a 0 otherwise.

The input weight matrix and the bias of the network were trained by a cyclical order incremental training method. The resulting input weight matrix, IW, and the bias vector, b, are represented in the following equations.

$$IW = \begin{bmatrix} -9.24 & -0.645 \\ 10.0 & 15.03 \end{bmatrix}$$

$$b = \begin{bmatrix} -1.0 \\ -1.0 \end{bmatrix}$$

FIGS. 9 and 10 are tables that present the validation results of the fuel property classifier 10 at conditions A and condition C, respectively, for Scenario I. As shown, the classifier 10 was verified to be able to accurately classify the fuels for all test inputs.

Because there were only three different fuels, during the training, the Euro III diesel fuel was represented as [0; 0] (0), the US ULSD fuel was represented as [0; 1] (1), and the bio-diesel fuel was represented as [1; 0] (2). Data obtained from the experimental test was not exposed to the neural network during the training process. These data were used to validate the generalization capability of the trained neural network.

After classifier 10 was well trained, the test results obtained for the three different fuels at conditions A and C were supplied as inputs to the classifier for output verification.

As described above, once the fuel is classified as one of the known fuels, all the fuel properties associated with this fuel become available from the database pre-stored in the classifier. Therefore, all the fuel property information such as sulfur level, H/C ratio, etc., can be used for the engine control system to select the optimal control parameters, maps, strategies, and models for both combustion and exhaust treatment system management.

For Scenario II, the same neural network structure and training procedure were used to develop the fuel property classifier. The resulting input weight (IW) matrix and bias (b) vector from the training process are given in the following equations.

$$IW = \begin{bmatrix} -14.3 & 1.455 \\ 1.51 & 10.78 \end{bmatrix}$$

$$b = \begin{bmatrix} -1.0 \\ -1.0 \end{bmatrix}$$

For Scenario II, the trained neural network-based classifier was also validated for conditions A and C as shown in the tables of FIGS. 11 and 12, respectively. As shown, the fuel property classifier can classify the three different fuels for each of the test data sets.

The three different fuels are more separable for condition A than for condition C (as indicated by larger spacing between the groups in the input space). Condition A is a light load condition, which is arguably the most common engine operating condition during normal vehicle driving (passenger cars). Therefore, the active time of the fuel property classifier may cover a wide region of the vehicle operating time.

What is claimed is:

1. A fuel classifier for determining the type of fuel being consumed by an engine, comprising:
    a processing unit for determining if the engine is operating under operating conditions suitable for determining the type of fuel;
    a neural network for receiving input data and for generating fuel type data based on the input data;
    wherein the input data is at least one type of data from the following data types: ignition delay and cylinder pressure; and
    wherein the neural network operates by associating ignition delay with a cetane number or by associating cylinder pressure with heating value, and by then associating the cetane number or the heating value with a type of fuel.

2. The fuel classifier of claim 1, wherein the operating conditions are determined by at least one type of data from the group of data types: injection timing, injection fuel volume, injection fuel pressure.

3. The fuel classifier of claim 1, wherein the operating conditions are determined by at least one type of data from the group of data types: coolant temperature, engine speed, pedal position, engine load.

4. The fuel classifier of claim 1, wherein the cylinder pressure data is indicated mean effective pressure (IMEP) data.

5. The fuel classifier of claim 1, further comprising a parameter selector for receiving data representing a fuel type from the neural network, and for selecting engine control parameters associated with that fuel type.

6. The fuel classifier of claim 1, wherein the data types also include the air-fuel ratio of the exhaust, wherein the neural network further operates by associating the air-fuel ratio with a stoichiometric air-fuel ratio, and by then associating the stoichiometric air-fuel ratio with a fuel type.

7. The fuel classifier of claim 1, wherein the data types also include the smoke level of the exhaust, wherein the neural network further operates by associating the smoke level with a hydrogen-carbon ratio, and by then associating the hydrogen-carbon ratio with a fuel type.

8. An engine control system for controlling operations of a system associated with an engine, based on the fuel type being consumed by an engine, comprising:
    a processing unit for determining if the engine is operating under operating conditions suitable for determining the type of fuel;
    a fuel classifier for receiving input data and for generating fuel type data based on the input data;
    wherein the input data is at least one or more of the following types of data: cylinder pressure or ignition delay; and
    wherein the fuel classifier operates by associating ignition delay with a cetane number or by associating cylinder pressure with heating value, and by then associating the cetane number or the heating value with a type of fuel;
    a selector for matching control parameters to the fuel type data; and
    a controller for receiving the control parameters from the selector and for generating control signals based on the control parameters.

9. The system of claim 8, wherein the fuel classifier is implemented as a neural network.

10. The system of claim 8, further comprising a model database for storing model data and accessible by the selector, for use in selecting the control parameters.

11. The system of claim 8, wherein the models database stores at least one in-cylinder combustion model.

12. The system of claim 8, wherein the models database stores at least one exhaust composition estimation model.

13. The system of claim 8, wherein the models database stores at least one fault diagnostics model.

14. The system of claim 8, wherein the models database stores at least one engine optimization model.

15. The system of claim 8, wherein the control signals control the engine.

16. The system of claim 8, wherein the control signals control the emissions system.

17. A method of classifying fuels, comprising:
   determining if current operating conditions of the engine are suitable for fuel classification;
   using a fuel classifier to receive input data and to output fuel type data based on the input data; and
   wherein the input data is at least one of more data type from the following group of data types: ignition delay data or cylinder pressure data; and
   wherein the fuel classifier operates by associating ignition delay with a cetane number or by associating cylinder pressure with heating value, and by then associating the cetane number or the heating value with a type of fuel.

18. The method of claim 17, wherein the fuel classifier is a neural network.

19. The method of claim 17, further comprising normalizing the input data.

20. The method of claim 17, wherein the step of using the fuel classifier is halted during an engine operating condition of: single injection and no exhaust gas recirculation.

21. The method of claim 17, wherein the step of using the fuel classifier is performed only during light load engine operating conditions.

* * * * *